(12) United States Patent
Chess et al.

(10) Patent No.: US 9,782,691 B2
(45) Date of Patent: Oct. 10, 2017

(54) CLOSED LOOP SUPERCRITICAL AND SUBCRITICAL CARBON DIOXIDE EXTRACTION SYSTEM FOR WORKING WITH MULTIPLE COMPRESSED GASES

(71) Applicant: Frederick J. Chess, Seattle, WA (US)

(72) Inventors: Frederick J. Chess, Seattle, WA (US); J. Michael McCutcheon, Seattle, WA (US)

(73) Assignee: Frederick J. Chess, Seattle, WA (US)

( * ) Notice: Subject to any disclaimer, the term of this patent is extended or adjusted under 35 U.S.C. 154(b) by 0 days.

(21) Appl. No.: 14/664,386

(22) Filed: Mar. 20, 2015

(65) Prior Publication Data
US 2015/0283477 A1 Oct. 8, 2015

Related U.S. Application Data

(60) Provisional application No. 61/974,836, filed on Apr. 3, 2014.

(51) Int. Cl.
*C11B 1/00* (2006.01)
*B01D 3/40* (2006.01)
*C11B 1/10* (2006.01)

(52) U.S. Cl.
CPC ............... *B01D 3/40* (2013.01); *C11B 1/104* (2013.01); *Y02P 20/544* (2015.11)

(58) Field of Classification Search
CPC .................................. B01D 3/40; C11B 1/104
USPC ............................................................. 554/8
See application file for complete search history.

(56) References Cited

U.S. PATENT DOCUMENTS 8,048,304 B2 * 11/2011 Waibel ................... B01D 3/007
165/4

* cited by examiner

*Primary Examiner* — Deborah D Carr
(74) *Attorney, Agent, or Firm* — Seed IP Law Group LLP

(57) ABSTRACT

A carbon dioxide extraction system which recirculates $CO_2$ and/or other gases in a continuous loop for maximum extraction efficiency and which recovers substantially all gases at the end of the extraction cycle for cost savings and greater workplace safety. The extractor utilizes a dual pumping system which can incorporate high vapor pressure $CO_2$ and/or lower vapor pressure gases such as propane, butane, chemical refrigerants such as R134a, and other lower vapor pressure gases. The system allows the operators to work with supercritical $CO_2$ alone with high pressure liquid pump(s), lower vapor pressure gases alone with modified refrigerant recovery pump(s), or a mixture of $CO_2$ and lower vapor pressure gases using a combination of high pressure liquid pump(s) for extraction and modified refrigerant recovery pump(s) for full recovery of gases at the end of an extraction cycle.

3 Claims, 1 Drawing Sheet

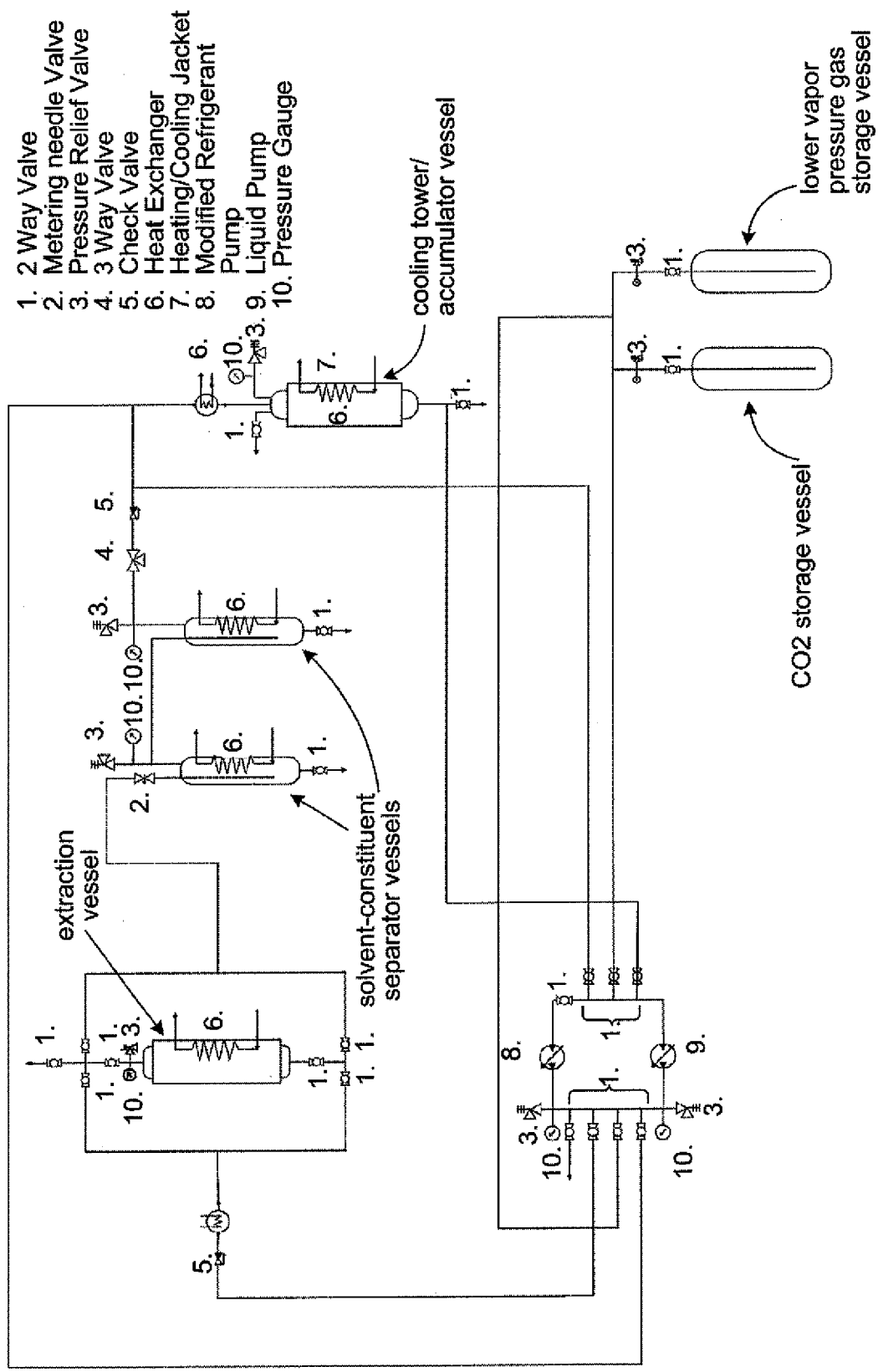

CLOSED LOOP SUPERCRITICAL AND SUBCRITICAL CARBON DIOXIDE EXTRACTION SYSTEM FOR WORKING WITH MULTIPLE COMPRESSED GASES

BACKGROUND

Technical Field of the Invention

The present invention relates to processes, apparatuses and systems for continuously cycling supercritical CO2 and/or other compressed gases through a solid matrix for extracting constituents from that matrix. The described processes, apparatuses and systems incorporate a method for using single gases or combinations of gases of widely varying vapor pressures in ways that maximize extraction efficiency and allow for complete recovery of working gases Description of the Related Art Supercritical $CO_2$, hydrocarbons like butane and propane, and refrigerant gases like R134a are used in the natural products industry for extracting constituents, particularly oils, from botanicals, such as those included in the cannabis genus. Each gas has its advantages and disadvantages. For example, extractions utilizing $CO_2$ gas can yield pure extracts with virtually no solvent traces. $CO_2$ also has the characteristic that its solvent properties can be finely adjusted with differences in pressure and temperature. Hydrocarbons such as propane and butane have the advantage of being extremely effective solvents resulting in the ability to complete extraction processes quickly. One downside of using propane or butane as a solvent is their extreme flammability. Because of their high price and flammability recovering all of a hydrocarbon extractor at the end of an extraction process is an important and valuable feature.

In certain cases involving extraction of constituents from certain natural products, combinations of $CO_2$, hydrocarbon and refrigerant gases will overcome certain disadvantages and enhance certain advantages of the extraction process. Until now, there has been a need for an extraction process or system available to the natural products industry which utilizes the gases listed above in an efficient manner. Older extraction systems using gas booster technology were able to conduct $CO_2$ extractions or an extraction using one of the listed lower pressure gases; however such systems could not carry out an extraction using a combination of $CO_2$ and one of the lower pressure gases. This shortcoming of prior gas extraction systems was due in part to the inability of the gas booster technology to accurately combine and pump gas vapors of widely varying vapor pressures due to the propensity of liquefied, pressurized gases to give off their vapor at different rates, determined by their inherent vapor pressures or boiling points.

Furthermore, when utilized in the supercritical extraction of constituents from natural products, gas boosters are inherently slow and prone to requiring high levels of maintenance.

BRIEF SUMMARY

Extraction systems of the type described herein utilize a combination of a high pressure liquid pump and modified refrigerant pump(s). The high pressure liquid pump moves combinations of the gas extractants (in liquid form). The combination of the gas extractants (in liquid form) can be maintained in desired closely toleranced percentages because the percentages of the gas extractants will remain stable when in the liquid phase. For example, when $CO_2$ is used as an extractant, the high pressure pump(s) apply sufficient pressure required to keep the $CO_2$ in its liquid phase. This same pressure will keep the lower pressure extractant gases used in combination with the $CO_2$ in a liquid state. Pumping liquid demonstrates faster extractions and more reliable constituent yields. Use of a refrigerant pump allows for the complete recovery of all the extraction gases at the end of the cycle as the pressure is pulled down into the vacuum range.

A carbon dioxide extraction and recovery system in accordance with embodiments described herein includes an extraction vessel with components which include a high pressure rated extractor vessel for contacting the natural product with supercritical $CO_2$ and/or a hydrocarbon having a lower vapor pressure than $CO_2$, an efficient separator vessel for flashing off compressed gases to separate extract from liquid extraction solvents, a cooling tower and accumulator vessel for efficiently converting gases back to liquid, a high pressure liquid pump for circulating the compressed gas, or gases, through the extraction vessel, a modified refrigerant recovery pump capable of building pressure up and pulling down into the vacuum range for efficient and full recovery of gases at the end of an extraction cycle.

Extraction apparatuses, systems and processes of the type described herein perform supercritical and subcritical $CO_2$ extractions of natural products, such as botanicals. The extraction apparatuses, systems and processes utilize flammable gases such as butane and/or propane in a way that mitigates the flammable nature of these solvents. The extraction apparatuses, systems and processes of the type described herein provide an efficient and effective way to utilize combinations of $CO_2$ and lower vapor pressure gases for extracting constituents from natural products such as botanicals. The apparatuses, systems and processes described herein fully recover the $CO_2$ and lower vapor pressure gases used to extract the constituents and provide safe, quick and flexible options for extracting constituents from natural products such as botanicals.

In accordance with an embodiment of a system for extracting constituents from a natural product described herein, the system includes an extraction vessel, a separator vessel in fluid communication with the extraction vessel, an accumulator vessel in fluid communication with the separator vessel, a refrigerant pump in fluid communication with the accumulator vessel and the extraction vessel, a liquid pump in fluid communication with the accumulator vessel and the extraction vessel, a $CO_2$ storage vessel and a lower pressure gas storage vessel. In accordance with this embodiment, the $CO_2$ storage vessel, lower pressure gas storage vessel, extraction vessel and accumulator vessel are in fluid communication with the refrigerant pump and the liquid pump.

In accordance with another embodiment of a system for extracting constituents from a natural product described herein, the separator vessel is in fluid communication with the refrigerant pump and the liquid pump.

In accordance with embodiments of methods of extracting constituents from a natural product described herein, the natural product is contacted with liquid $CO_2$ and a liquefied gas having vapor pressure lower than the vapor pressure of $CO_2$. The liquid $CO_2$ and liquefied gas having a vapor pressure lower than the vapor pressure of $CO_2$ extracts constituents from the natural product. The extracted constituents are separated from the liquid $CO_2$ and the liquefied gas by flashing the liquid $CO_2$ and the liquefied gas. In accordance with these embodiments, the flashed liquid $CO_2$ and the flashed liquefied gas are collected, condensed and pressurized. In accordance with yet other embodiments of the methods described herein, the pressurized $CO_2$ and the pressurized liquefied gas are introduced into the extraction vessel.

In still another embodiment of the methods for extracting constituents from a natural product described herein, a liquid pump is utilized to recover $CO_2$ from the separator vessel and the recovered $CO_2$ is returned to the extraction vessel.

BRIEF DESCRIPTION OF DRAWINGS

FIG. 1 illustrates apparatuses, systems and processes in accordance with embodiments described herein.

DETAILED DESCRIPTION

It will be appreciated that, although specific embodiments of the subject matter of this application have been described herein for purposes of illustration, various modifications may be made without departing from the spirit and scope of the disclosed subject matter. Accordingly, the subject matter of this application is not limited except as by the appended claims.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with extraction of constituents from natural products, such as botanicals, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

Generally described, the present disclosure is directed to examples of systems and methods for utilizing liquefied $CO_2$ and liquefied gases having a vapor pressure less than the vapor pressure of $CO_2$ to extract constituents from a natural product in a closed system.

Four different options of systems, apparatuses and processes for extracting constituents from natural products, such as botanicals, are described with reference to FIG. 1. The first option involves an extraction utilizing $CO_2$ only. As an example of this option, a dried, ground plant material would be sealed within an extractor vessel. Liquefied $CO_2$ would flow from a $CO_2$ accumulator vessel into a liquid pump 9 whereby the CO2 is pressurized to the desired extraction pressure in the extractor vessel. A heat exchanger between the pump and extractor vessel controls the temperature of the $CO_2$ entering the extractor vessel and also determines whether the $CO_2$ is in a subcritical or supercritical state. These extractions take place at between 900 and 5,000 psi. $CO_2$ flows through the extraction vessel and dissolves the desired constituents into the liquid $CO_2$ stream. The $CO_2$ which is saturated with extract flows through a pressure regulating valve and is depressurized into a solvent constituent separator vessel. The separator vessel is also heated. The combination of an elevated temperature and lower pressure within the separator vessel causes the $CO_2$ to flash to vapor while the less volatile extract falls into the bottom of the separator. The $CO_2$ vapor exits the top of the separator and into a cooling tower where it condenses and drops into a $CO_2$ accumulator. From the $CO_2$ accumulator, the condensed $CO_2$ flows back to the liquid pump 9. When the extraction is complete, the $CO_2$ is pumped back into the accumulator or a separate $CO_2$ storage tank for re-use at a later time.

The second option utilizes a refrigerant pump 8. A lower vapor pressure gas such as refrigerant R134a, butane or propane is pumped through an extraction vessel. These gases extract efficiently at much lower pressures than $CO_2$, on the order of about 50 to about 350 psi. The refrigerant pump 8 is capable of pumping liquid or vapor and generates moderate pressures up to 700 psi. In addition the refrigerant pump is capable of pulling a vacuum, e.g., a full vacuum of about 30 inches Hg. The extraction cycle is substantially the same as the $CO_2$ process described in the first option only it is carried out at lower pressures. The vacuum capability of the refrigerant pump 8 is utilized at the end of the cycle and allows for full recovery of the expensive and potentially harmful and dangerous gases. The vacuum capability of the refrigerant pump 8 also allows an operator to remove air from the system prior to extraction which is valuable when using the flammable lower vapor pressure gases.

In the third option, a combination of $CO_2$ and a lower vapor pressure gas is used. Examples of a lower vapor pressure gas include those described in the preceding paragraphs. The desired mix of $CO_2$ and lower vapor pressure gas is pumped into the accumulator prior to extraction. All air is evacuated out of the system after dried, ground plant material is sealed into the extraction vessel. The liquid pump 9 is used to pressurize and circulate the mixed gases through the extraction vessel and into the separator. Due to its higher vapor pressure, $CO_2$ exits the separator(s) faster than the lower vapor pressure gas(es) causing the lower vapor pressure gas to build up in the separator. To overcome this build up, the refrigerant pump 9 can be engaged periodically throughout the procedure to recover the excess gas from the separator(s) and mix it back into the accumulator to keep the gases mixed properly. At the end of the extraction cycle, all gas will be pumped out of the extractor and back to storage tanks leaving extract in the separator(s).

The fourth option in which the systems, apparatuses and processes described herein can be utilized is a very low pressure, cold, subcritical $CO_2$ extraction. This type of extraction would take place in the range of 800-900 psi. In accordance with this option, the separator(s) would be kept at a lower pressure of about 500 psi. Due to the difficulty in condensing $CO_2$ at this pressure, the method utilizes the refrigerant pump in the same manner as a conventional gas booster. $CO_2$ vapor would exit the separator(s) at about 500 psi and enter the refrigerant pump 8 inlet where it would be compressed, cooled and circulated back through the extractor vessel.

The advantage to using refrigerant pump(s) 8 for this option compared to use of a gas booster is that a refrigerant pump 8 can also pump liquid. Accordingly, upon startup, an operator can quickly fill the extractor vessel with liquid $CO_2$ and then switch to pumping vapor coming out of the separator(s). Periodic flushing of the refrigerant pump 8 with liquid $CO_2$ will wash out minute particulates of extracted constituents which are entrained in the $CO_2$ vapor. These minute particulates if not removed from the refrigerant pump could clog and/or damage the refrigerant pump 8.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for extracting constituents from a natural product comprising:
   an extraction vessel;
   a separator vessel in fluid communication with the extraction vessel;
   an accumulator vessel in fluid communication with the separator vessel;
   a refrigerant pump capable of pumping vapor, the refrigerant pump in fluid communication with the accumulator vessel and the extraction vessel;
   a liquid pump capable of pumping liquid in fluid communication with the accumulator vessel and the extraction vessel;
   a $CO_2$ storage vessel; and
   a lower pressure gas storage vessel, wherein the $CO_2$ storage vessel and lower pressure gas storage vessel are in fluid communication with the refrigerant pump and the liquid pump.

2. The system for extracting constituents from a natural product of claim 1, wherein the separator vessel is in fluid communication with the refrigerant pump and the liquid pump.

3. The system for extracting constituents from a natural product of claim 1 wherein the extraction vessel communicates with a top of the separator vessel.

* * * * *